United States Patent [19]

Sullivan et al.

[11] 3,911,439
[45] Oct. 7, 1975

[54] APPARATUS FOR AUTOMATICALLY DETERMINING THE BEARING CENTER OF RADAR BEAMS

[75] Inventors: Dean R. Sullivan, Lakeside; John D. Vinatieri, San Diego, both of Calif.

[73] Assignee: The United States of America as represented by the Secretary of the Navy, Washington, D.C.

[22] Filed: Feb. 22, 1971

[21] Appl. No.: 117,696

[52] U.S. Cl............... 343/118; 343/6 R; 343/106 R
[51] Int. Cl.²............................................. G01S 3/16
[58] Field of Search................. 343/118, 106 R, 6 R

[56] References Cited
UNITED STATES PATENTS

| | | |
|---|---|---|
| 2,730,716 | 1/1956 | Granqvist............................ 343/118 |
| 3,077,595 | 2/1963 | Frost............................. 343/118 UX |
| 3,077,597 | 2/1963 | Macek............................. 343/118 X |

*Primary Examiner*—Maynard R. Wilbur
*Assistant Examiner*—Richard E. Berger
*Attorney, Agent, or Firm*—R. S. Sciascia; G. J. Rubens; T. M. Phillips

[57] ABSTRACT

Electronic apparatus for automatically determining the bearing center of received radar beams. Each received beam hit sequence is processed by a beam-splitter which essentially counts the number of hits which occur as the beam sweeps by a target and selects the median of the number of hits as the bearing center of the beam. A plurality of identical beam-splitters are connected in a predetermined configuration such that substantially simultaneous processing of more than one received beam can be accomplished.

5 Claims, 4 Drawing Figures

INVENTORS
DEAN R. SULLIVAN
BY  JOHN D. VINATIERI

ATTORNEYS

INVENTORS
DEAN R. SULLIVAN
JOHN D. VINATIERI
BY
ATTORNEYS

APPARATUS FOR AUTOMATICALLY DETERMINING THE BEARING CENTER OF RADAR BEAMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention is closely related to the inventions disclosed in pending patent applications S.N. 8157, now abandoned, entitled "Low Intercept Susceptibility Air Navigation System," filed on Jan. 15, 1970 by Willis H. Dawirs et al., and in U.S. Pat. No. 3,665,326, Patented May 23, 1972, and entitled "Automatic Threshold Detector With Selectable Percentage of Threshold Crossings," filed on June 18, 1970 by Dean R. Sullivan. In air navigation systems in general and in systems of the type described in the abovementioned patent application and patent in particular which employ automatic target detection, apparatus for automatically determining the bearing center of each of a plurality of beams received at substantially the same time is essential to assure optimum system performance. This capability is necessary, for example, when several beams are received simultaneously on substantially the same azimuth but from different ranges as could occur in a multiple target environment, also to assure that transmissions are not missed due to interfering natural or jamming noise which can load up a single-beam splitter. The present invention provides a unique electronic multiple-beam splitter array which can simultaneously process a plurality of received beams to automatically determine the bearing center of each of the beams.

SUMMARY OF THE INVENTION

In air navigational systems wherein navigational data is transmitted from a ground station to friendly aircraft, aircraft apparatus for automatically determining aircraft bearing relative to the ground station. Transmission time zero and the precise time that the transmit, rotating antenna is pointing North is known at the aircraft and the apparatus is synchronized thereto. Received data signals are digitally correlated at the aircraft to produce a time-correlated hit sequence as a beam sweeps past. Novel beam splitter apparatus processes the hit sequence to produce a leading edge pulse, a trailing edge pulse, and a cumulative hit pulse proportional to the median of the number of hits which occur between the leading edge and trailing edge pulses. A bearing counter synchronized to time zero and North bearing provides a bearing readout when it receives the leading edge pulse and the readout is updated by an amount proportional to the cumulative hit pulse until such time as the trailing edge pulse is received, whereby aircraft can determine range and bearing to the ship each time the data beams sweeps past the aircraft.

OBJECTS OF THE INVENTION

It is the primary object of the present invention to provide radar air-navigational apparatus for automatically determining the bearing center of received radar beams.

It is another very important object of the present invention to provide radar air-navigational apparatus for simultaneously processing a plurality of received radar beams to automatically determine the bearing center of each beam.

It is another object of the present invention to provide beam-splitter apparatus that can be used to automatically determine the bearing center of time-jittered radar transmissions.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
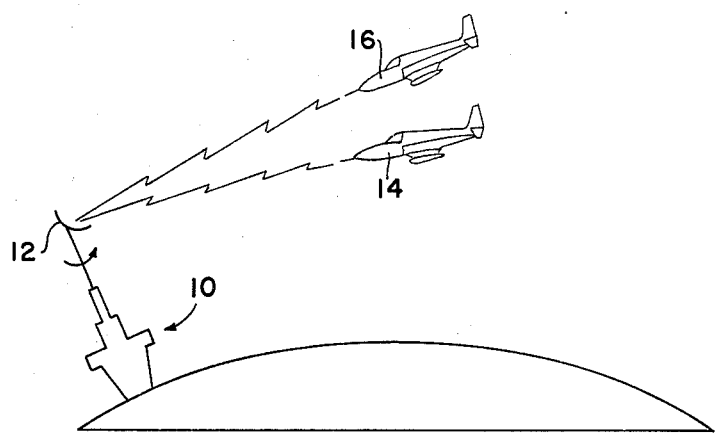
FIG. 1 is a simplified illustration of a ship-to-aircraft navigational system which can advantageously utilize the novel apparatus disclosed herein.

FIG. 1 is a simplified drawing of a ship-to-aircraft navigational system in which a ship 10 transmits range and bearing information by means of a transmitter system (not shown) and a rotational antenna 12 to one or more friendly, subscribing aircraft 14 and 16. Ship 10 could comprise, for example, an aircraft carrier to which the aircraft 14 and 16 are seeking to return.

Figure 2:
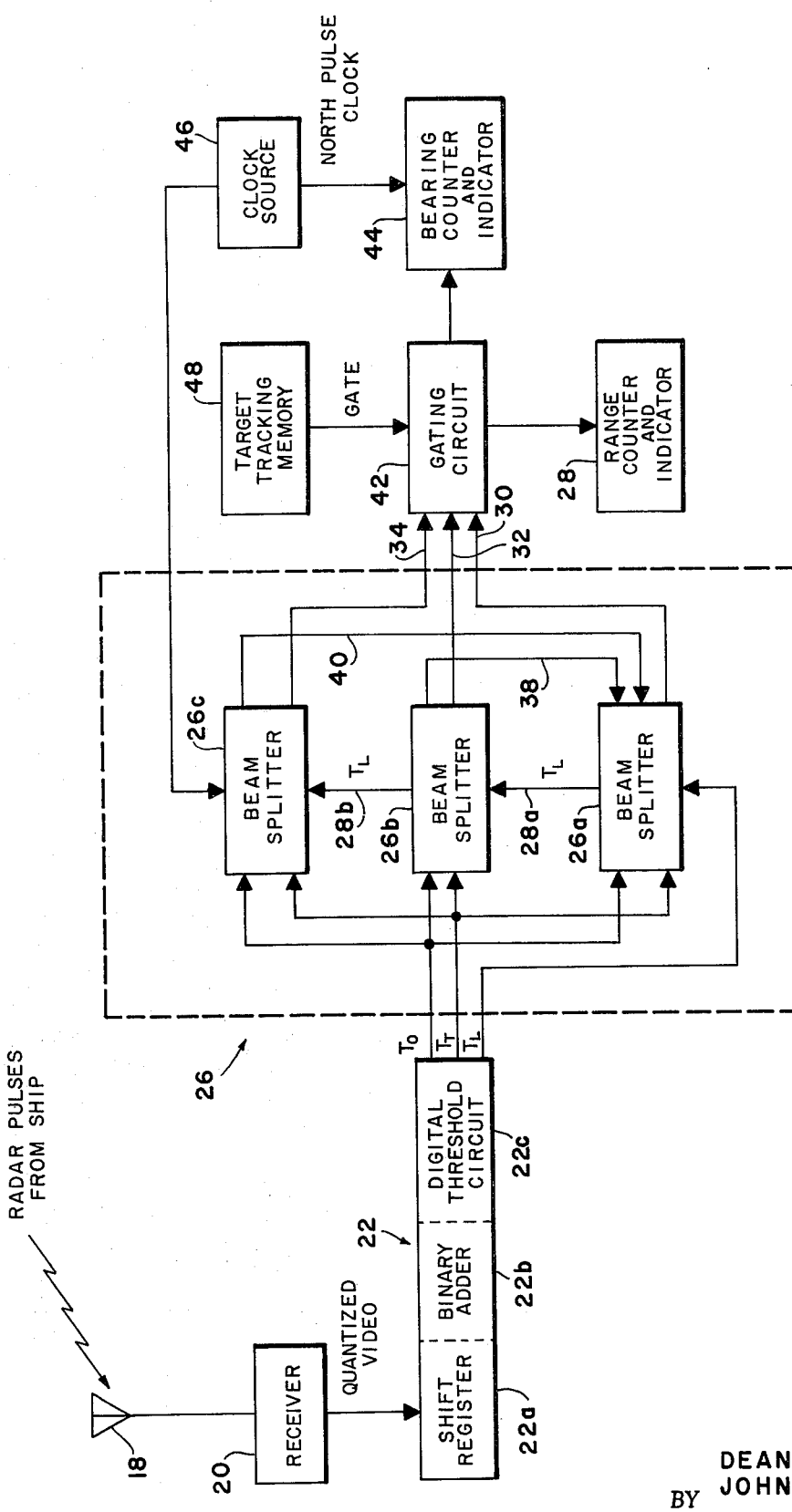
FIG. 2 is a simplified schematic diagram of a multiple-beam splitter array embodying the inventive concept to be disclosed herein.

FIG. 2 illustrates in schematic form the information receiving and processing apparatus which is located on each aircraft and which automatically provides the pilots of the aircraft with range and bearing information in digital form relative to the ship 10. In FIG. 2, radar pulses transmitted from the ship 10 are received at the aircraft by the antenna 18 which couples the pulses to a conventional receiver 20. In the receiver 20, the received pulses are processed to produce a quantized video output.

That is, the receiver output comprises either logic "ones" or "zeros" depending on whether or not the pulses have exceeded a selectively predetermined analog threshold level. Analog threshold circuitry of the type disclosed in the Sullivan patent mentioned previously can be used to accomplish the above.

The quantized video signal from the output of the receiver 20 is connected to a pulse correlator 22 which essentially comprises a shift register 22a, a binary adder 22b, and a digital threshold circuit 22c connected in a series configuration. The pulse correlator 22, which is also known as a binary integrator, operates essentially on probability theory to correlate the received pulses as a function of time, i.e., range, and to provide a logical output which is coupled to the multiple-beam splitter array 26.

The quantized video output from the receiver 20 is continuously examined by the correlator 22 for every range in a selectively predetermined transmission interval or block as described in the above referenced patent to Sullivan. For example the quantized video output could be examined continuously in blocks of ten successive transmissions. If a selectively predetermined number of analog threshold crossings ("ones") from the receiver 20 are detected at a particular range by the digital threshold circuit 22c, a beam transmission from the ship's transmitting antenna 12 is automatically declared in a manner to be described hereinafter with reference to the $T_L$ output from the correlator 22.

The shift register 22a in the pulse correlator 22 stores the binary outputs from the receiver 20 for (N−1) successive transmissions. The binary output for the $N^{th}$ transmission, however, is observed in real time. Thus whenever a logic "one" indicating an analog threshold crossing by the received beam is received by the shift register 22a, a logic "one" will appear in the appropriate range bin of the shift register.

When a pulse is received at the aircraft, it is displaced from time zero, (i.e., the time of transmission) by the amount of time required for the pulse to travel the one-way path from the ship's transmitter (not shown) to the aircraft receiver 20. This time displacement can be converted into ranging information in the conventional range counter and indicator 28.

The results for each transmission interval or block are summed in the binary adder 22b for each range under consideration. The output of the binary adder is then compared with a selectively predetermined digital threshold level in the threshold circuit 22c.

If the output of the adder 22b for a particular range exceeds the selected threshold, a "hit", i.e., beam detection is automatically declared as the output decision of the correlator 22. That is, no beam detection is declared until a given number of analog threshold crossings at a particular range are present as indicated by the output of the adder.

It should be noted that the current decision can be compared with previous decisions using scan-to-scan correlation techniques to determine if a certain correlation exists. For example if the results of a present antenna scan are substantially equal to the results of previous scans, a beam detection is declared thereby minimizing false alarm indications. The target tracking memory 48 can be used to accomplish this in a manner to be described hereinafter.

The output of the pulse correlator 22 comprises three distinct digital pulses $T_L$, $T_T$, and $T_O$, which are directly coupled to the multiple-beam splitter apparatus 26. The three pulses $T_L$, $T_T$, and $T_O$, are derived as follows.

Assume that a bearing decision is required for every ten successive transmissions (i.e., N=10) received from the rotating antenna 12 at a particular range. Further assume that the number K represents the sum of the analog threshold crossings which occur out of every ten transmissions as determined by the digital threshold circuit 22c.

As a transmitted beam from the rotating antenna 12 sweeps by the aircraft 14 or 16, the value of K will increase from zero in increments of one as the center of the beam approaches the aircraft. Conversely, as a beam recedes from the aircraft, the value of K will decrease from its maximum value to a value of zero in increments of one when the beam has completely swept by the aircraft.

Thus as a beam sweeps by an aircraft, a typical ideal output (hit sequence) sequence of values of K might be as follows:

K = 0, 1, 2, 3, 4, 5, 6, 7, 8, 9, 10, 9, 8, 7, 6, 5, 4, 3, 2, 1, 0.

The novel beam splitter apparatus 26 essentially examines the above hit sequence or like sequences to automatically determine the bearing center of beams transmitted by one or more transmitters at substantially the same time.

This determination is accomplished in part by defining a leading edge and a trailing edge for the output sequence of values of K. For example, an output decision of K=6 can be selected as the leading edge and K=4 can be selected as the trailing edge. Thus when the correlator 22 achieves a count of K=6, it produces the $T_L$ pulse and when it achieves a count of K=4 on the trailing edge it produces the $T_T$ pulse.

The $T_O$ cumulative hit pulse represents a cumulative count of the number of pulses received between the $T_L$ and $T_T$ pulses and which exceed K=4.

It should be noted that the value of the leading edge (K=6) is selected to be greater than the value of the trailing edge (K=4). This is done to assure that during a single beam transmission only one sequence is indicated since random noise could create an erroneous $T_L$ pulse. For example if $T_L$ and $T_T$ are both produced when K=6, a noise pulse occurring at K=5 after the beam center had swept by the aircraft could cause the correlator 22 to count K=6 pulses whereby an erroneous $T_L$ pulse would be produced.

If the trailing edge is selected to be equal to K=4 and the leading edge is selected to be equal to K=6, a random noise pulse at K=5 would not cause a false $T_L$ indication to occur, although a wider beam would have to be processed by the multiple beam splitter 26.

It can be seen from FIG. 2 that the multiple-beam splitter apparatus 26 essentially comprises three identical beam splitter circuits 26a, 26b, and 26c. It can be appreciated that more than three beam splitters could be used if necessary although only three are shown for purposes of explanation.

The $T_L$ pulse which starts the beam splitter 26a is coupled directly to that beam splitter and the $T_O$ and $T_T$ pulses are coupled in parallel to each of the three beam splitter circuits. It can be seen however that the $T_L$ pulses can be coupled to the beam splitters 26b and 26c through the conductors 28a and 28b, respectively in a manner to be described hereinafter.

Thus in operation, if a single received beam is being processed, the $T_L$ pulse would start only the beam splitter circuit 26a which would then accept the $T_O$ pulse and would stop when the $T_T$ pulse is received. None of the other beam splitters would be energized in this situation.

The bearing center of the sequence is essentially determined by reading out the bearing when $T_L$ occurs as determined from a bearing reference in the aircraft (in synchronism with the transmitting antenna 12). The bearing center is then read out when $T_L + T_O/2$ occurs.

However since the beam splitter 26a does not start its processing until the leading edge $T_L$ pulse is received, it is obvious that the processed bearing center of a beam will actually lag the true antenna position. Consequently, a bias value must be subtracted from the bearing reference to compensate for this difference.

In the event that the beam splitter 26a is already processing a sequence or overloaded by random noise when a $T_L$ pulse is received at the beam splitter 26a, the $T_L$ pulse will bypass that beam splitter and be coupled through the conductor 28a to the beam splitter 26b which will then process the sequence.

Obviously, if the beam splitter 26b is likewise in operation, the $T_L$ pulse will be routed to the third beam splitter 26c via the conductor 28b.

The outputs 30, 32, and 34 from the beam splitter circuits 26a, 26b, and 26c, respectively, are coupled to a gating circuit 42. It should be noted that a feedback path 38 is provided between the beam splitters 26a and 26b, and a like feedback path 40 is provided between the beam splitters 26a and 26c for a purpose to be described hereinafter with reference to FIG. 3.

The digital output from the gating circuit 42 is fed to a bearing counter and indicator 44 which also receives North reference pulses and clock pulses from the clock source 46. The gating circuit also receives an input gate from the target memory 48.

Figure 3:
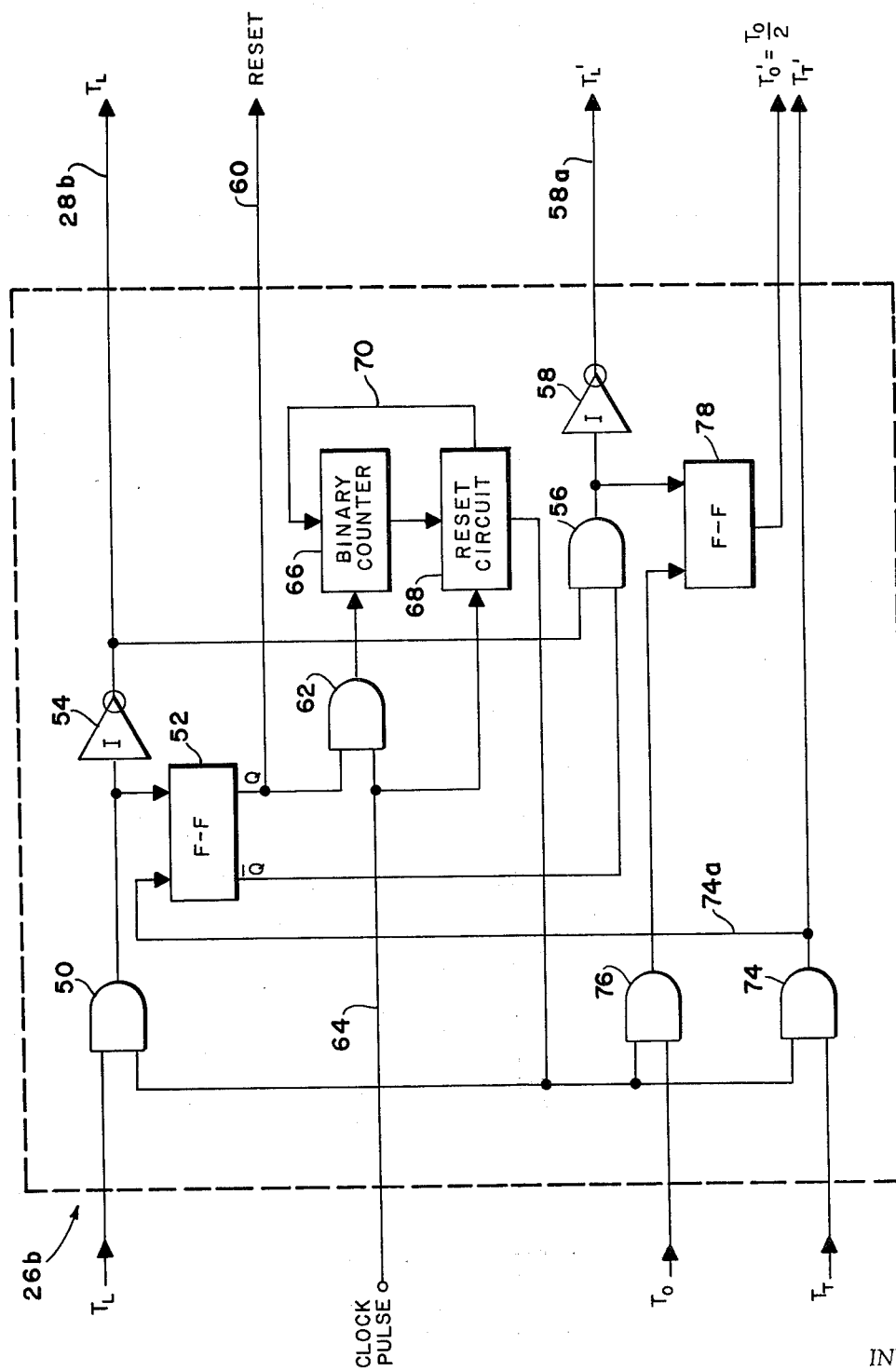
FIG. 3 is a simplified schematic drawing of a typical beam splitter of the type shown in FIG. 2.

FIG. 3 is a schematic drawing of the beam splitter 26b and will be used to describe the beam-splitting process of a beam having a leading edge value of K=6 and a trailing edge value of K=4.

In operation, as the antenna 12 of FIG. 1 begins a sweep past the receiver antenna 18 of FIG. 2 on the aircraft, the $T_L$ pulse is a logic "zero". As the beam becomes stronger, received signal pulses which exceed the analog threshold level are summed by the binary adder 22b in the correlator 22. Eventually the leading edge of the sequence is reached, i.e., K=6 pulses are in storage in the shift register 22a, and the $T_L$ pulse becomes a "one."

The $T_L$ pulse is then coupled to the input NAND gate 50 which gates the pulse to the flip-flop 52 and the inverter 54. The $T_L$ pulse sets the flip-flop 52 which remains in that condition until the trailing edge pulse $T_T$ is received by the beam splitter. The Q output (complimentary) of the flip-flop 52 is coupled to the NAND gate 56 which thereby inhibits subsequent $T_L$ pulses from the inverter 54 from passing through the inverter 58 to the output line 58a where they appear as $T_L'$ pulses. Thus, if a subsequent $T_L$ pulse is presented at the input of the beam splitter 26b, it will be routed through the inverter 54 to line 28b of FIG. 2 to be applied to the beam splitter 26c for processing as before.

The Q output (normal) from the flip-flop 52 is also fed to a NAND gate 62 which also receives system clock pulses on the line 64 to thereby produce a trigger pulse for the binary counter 66. The clock pulse rate can be selectively adjusted so that the pulses arrive at a rate equivalent, for example, to a one-mile propagation time whereby the counter 66 steps at a one-mile rate. The clock source 46 can comprise a constant or a time-jittered source associated with time-jittered transmission.

A system reset circuit 68 which also receives the clock pulses is connected to the counter 66. The reset circuit essentially presets the binary counter to correspond to the beam transmission rate by means of a reset pulse which is coupled through line 70 to the counter and which is produced in response to the counter output.

After a selectively predetermined number of clock pulses have been counted, the counter 66 will produce a "one" output. This "one" output is coupled in a feedback manner to the NAND gate 50 through the reset circuit 68 and is required to prevent starting a second beam splitter when K=6 is achieved on the trailing end of a sequence already being processed by the beam splitter 26b.

However, it should be noted that as previously discussed a $T_L$ pulse received from a target at a different range can be coupled to the beam splitter 26c through the line 28b. It should also be remembered that the output pulse $T_L'$ from the inverter 58 will not be available after the first $T_L$ pulse starts the beam splitter 26b because the NAND gate 56 acts as an inhibit gate which is controlled by the set condition of the flip-flop 52.

The Q (i.e., normal) output of the flip-flop 52 in its reset condition is coupled through line 60 to the equivalent NAND gate 50 in the beam splitter 26c. This gate pulse inhibits transfer of $T_L$ signals to the beam splitter 26c when the beam splitter 26b is available for accepting a $T_L$ pulse.

As mentioned previously the output of the binary counter 66 provides gating pulses to the NAND gates 74 and 76 which accept the input $T_T$ and $T_O$ pulses, respectively. This gating technique assures that these pulses will be passed by the NAND gates only if they correspond to the same range as the $T_L$ pulse.

The output $T_T'$ of the gate 74 is coupled through the line 74a to the flip-flop 52 as a reset pulse since at the time of its occurrence, the detected beam is considered as being complete, i.e., the trailing edge has passed by the aircraft.

The beam center is essentially determined by dividing in half the number of digital threshold crossings, K, which occur in the interval between the pulses $T_L$ and $T_T$. Since $T_O$ is a cumulative output from the correlator 22, the number of "ones" present at the $T_O$ line essentially represents the number of digital threshold crossings between $T_L$ and $T_T$.

Thus, after the $T_O$ pulse is gated by the NAND gate 76, it is applied to the flip-flop 78 which divides the $T_O$ count by two to produce the output pulse $T_O'$ where $T_O' = T_O/2$. The flip-flop 78 also receives the $T_L$ output pulse from the NAND gate 56 which "clears" the flip-flop 78.

Figure 4:
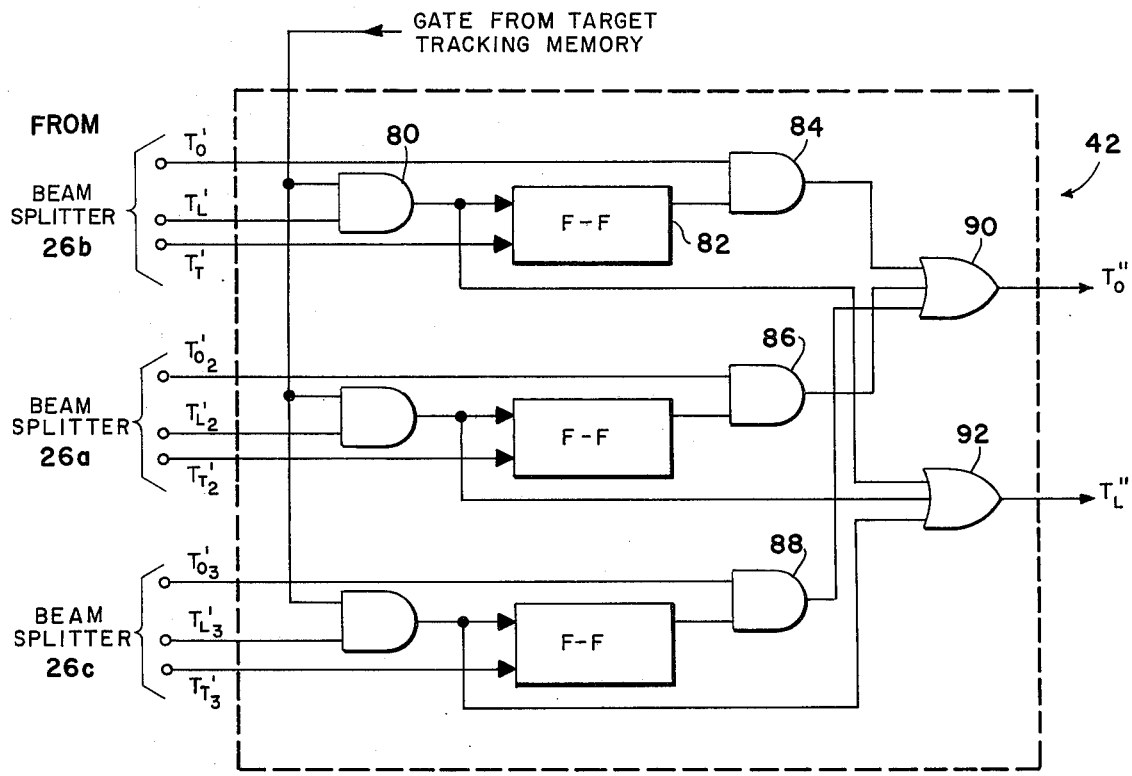
FIG. 4 is likewise a simplified drawing of a gate circuit of the type shown in FIG. 2.

The three outputs $T_L'$, $T_T'$, and $T_O'$ are then coupled to the gating circuit 42 which is shown in schematic form in FIG. 4. The gating circuit essentially comprises an interface circuit for the beam splitter apparatus 26 and the target tracking memory 48.

The target tracking memory 48 is used to gate the output of the beam splitter 26 such that the bearing indicator 44 displays bearing data for true transmissions and not false alarms. This could be accomplished, for example, by utilizing scan-to-scan correlation techniques as discussed previously.

In essence, in scan-to-scan correlation, the target tracking memory 48 compares the results of a present scan of the antenna 12 with a previous scan or scans, and if the results reveal a selectively predetermined correlation, a beam detection is declared. The detection is allowed to override any other sequence in process and the output of the appropriate beam splitter circuit is coupled to the bearing counter 44.

Although the beam splitter device 26 has been described with reference to FIG. 1, it should be clearly understood that the device can also be utilized to advantage by a ground air control station for multiple target (e.g., aircraft) detection. In this situation, the target tracking memory 48 could comprise, for example, a tracking computer. The computer could sort range and bearing information and maintain this information in memory for each target under surveillance and also reset each beam splitter after its information has been extracted. Obviously, such information for each target in memory could be used in any manner desired such as for a master display, for example.

From FIG. 4 it can be seen that the $T_L'$ pulse and the output of the target tracking memory are gated in the NAND gate 8. If scan-to-scan correlation results are acceptable, the $T_L'$ is coupled directly to the flip-flop 82 which is set thereby.

The flip-flop 82 produces a "one" pulse which opens the NAND gate 84 to the incoming $T_0'$ pulses.

It should be noted that the outputs $T_o'$, $T_{o_2}'$, and $T_{o_3}'$ of each of the three identical NAND gates 84, 86, and 88 are coupled to the OR gate 90 to produce the output, $T_0''$.

Likewise, each of the three $T_L'$ pulses are applied to the OR gate 92 to produce the output $T_L''$. $T_L''$ is fed to the digital bearing counter and indicator 44 to thereby start the bearing readout process.

The $T_T'$ pulse which indicates the trailing edge of the beam has occurred blocks further $T_0'$ pulses from reaching the OR gate 90 by resetting the flip-flop 82 and hence inhibiting the additional $T_0'$ pulses at the NAND gate 84.

The bearing counter and indicator 44 comprises a bearing counter, transfer logic, and a bearing readout counter (not shown). The bearing counter is maintained in synchronism with the transmitting antenna 12 by means of a time standard in the clock source 46 which produces a North mark reference pulse as shown in FIG. 2.

As previously mentioned, a bias must be introduced into the bearing readout process to compensate for the time the $T_L$ pulse lags the true antenna position. This bias can be set into the bearing counter by each North mark pulse every antenna revolution. Thus for example, instead of resetting the counter to 000 at each North pulse, the counter can be preset at 998 if a bias of 2 degrees is determined to be necessary.

The bearing counter is stepped at the same rate at which the antenna 12 is transmitting signals. For example, if the antenna is transmitting signals every one-third degree, the bearing counter can be made to read out or count in one-third degrees.

When a $T_L''$ pulse is applied to the bearing counter 44, the information being held in the bearing readout counter is read out in digital form.

The $T_0''$ pulses then step the bearing readout counter in appropriate steps until the $T_T'$ pulse is received by the gating circuit 42 as discussed previously. The bearing readout of the bearing counter at this time will equal the bearing center of the received beam.

Thus, it is apparent that a new and novel air-navigational apparatus has been disclosed which can simultaneously process the bearing center of a plurality of radar beams.

Obviously many modifications and variations of the present invention are possible in the light of the above teachings. It is therefore to be understood that within the scope of the appended claims the invention may be practiced otherwise than as specifically described.

What is claimed is:

1. In an air-navigational system wherein navigational information is transmitted from a ground station rotating antenna as radar beams to one or more subscriber aircraft, apparatus on board each of said aircraft for automatically determining the bearing of each of said aircraft relative to said ground station comprising:
   receiver means responsive to each of said radar beams to produce a quantized video output;
   digital correlator means responsive to said quantized video output to produce a digital, time-correlated hit sequence as said beam sweeps by said aircraft;
   said hit sequence having a selectively predetermined leading edge and trailing edge;
   beam splitter means responsive to said hit sequence to produce a leading edge pulse, a trailing edge pulse, and a cumulative hit pulse proportional to the median of the number of hits which occur between said leading edge and said trailing edge of said hit sequence;
   bearing counter means having a selectively predetermined, preset bias value and operating in synchronism with said rotating antenna;
   said bearing counter means being adapted to receive said leading edge pulse, said cumulative hit pulse, and said trailing edge pulse,
   whereby a bearing readout is provided when said leading edge pulse is received, said readout being updated by an amount proportional to said cumulative hit pulse, until said trailing edge pulse is received,
   whereby the bearing readout when said trailing edge pulse is received represents the bearing of said aircraft relative to said ground station.

2. The apparatus of claim 1 wherein said digital correlator comprises a shift register, a binary adder, and a digital threshold circuit connected in a series configuration.

3. The apparatus of claim 1 wherein said beam splitter means comprises a plurality of identical beam splitter circuits connected in such a manner that more than one hit sequence can be processed by said beam splitter means simultaneously.

4. The apparatus of claim 3 further including gating means and target tracking memory means connected between the output of said beam splitter means and said bearing to accommodate scan-to-scan correlation of said transmitted radar beams.

5. A method for automatically determining the bearing center of a received radar beam comprising the steps of:
   converting said beam into a quantized video signal;
   time-correlating said quantized video into a hit sequence having a predetermined leading edge and trailing edge;
   counting the number of hits in said sequence between said leading edge and trailing edge;
   dividing the count of said number of hits in half whereby the median of the number of said hits essentially comprises the bearing center of said beam.

* * * * *